US011342685B2

(12) United States Patent
Zhang et al.

(10) Patent No.: US 11,342,685 B2
(45) Date of Patent: May 24, 2022

(54) ANTENNA MODULE AND MOBILE TERMINAL

(71) Applicant: AAC Technologies Pte. Ltd., Singapore (SG)

(72) Inventors: Xuanbo Zhang, Shenzhen (CN); Yongli Chen, Shenzhen (CN); Xinqian Liu, Shenzhen (CN); Jiangyan Yang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/996,918

(22) Filed: Aug. 19, 2020

(65) Prior Publication Data
US 2020/0412015 A1     Dec. 31, 2020

Related U.S. Application Data

(63) Continuation of application No. PCT/CN2019/094083, filed on Jun. 30, 2019.

(51) Int. Cl.
*H04B 7/04* (2017.01)
*H01Q 21/06* (2006.01)
(Continued)

(52) U.S. Cl.
CPC ......... *H01Q 21/061* (2013.01); *H01Q 1/2291* (2013.01); *H01Q 1/243* (2013.01);
(Continued)

(58) Field of Classification Search
CPC ...... H01Q 1/2291; H01Q 1/243; H01Q 21/24; H01Q 21/06; H01Q 5/20; H01Q 5/307;
(Continued)

(56) References Cited

U.S. PATENT DOCUMENTS 10,431,872 B1 * 10/2019 Kim .................... H04M 1/0202
10,978,788 B2 * 4/2021 Liu ........................ H01Q 5/307
(Continued)

FOREIGN PATENT DOCUMENTS

| CN | 109301509 A | * | 2/2019 | ............. H01Q 23/00 |
| CN | 208738443 U | * | 4/2019 | ............. H01Q 23/00 |

(Continued)

*Primary Examiner* — Blane J Jackson
(74) *Attorney, Agent, or Firm* — W&G Law Group

(57) ABSTRACT

An antenna module and a mobile terminal are provided. The mobile terminal includes a shell including opposite upper and lower edges and opposite first and second side edges. First to fourth antennas are sequentially provided on the upper edge, and the first side edge is provided with a fifth antenna close to the upper edge. Sixth to eighth antennas are sequentially provided on the lower edge, and the second side edge is provided with a ninth antenna close to the lower edge. The first to ninth antennas form antenna groups respectively operating in communication frequency bands of 2G to 4G, GPS, WIFI2.4G, and WIFI5G, and an 8*8 MIMO antenna group operating in a 5G communication frequency band. The antenna module can operate in the 2G to 4G, GPS, and WIFI frequency bands, and have the 8*8 MIMO antenna and the antenna respectively operating in the 5G and WIFI5G frequency bands.

16 Claims, 14 Drawing Sheets

(51) Int. Cl.
    *H01Q 5/20*          (2015.01)
    *H01Q 5/307*        (2015.01)
    *H01Q 1/22*          (2006.01)
    *H01Q 1/24*          (2006.01)
    *H04B 7/0413*       (2017.01)
    *H04W 84/12*       (2009.01)

(52) U.S. Cl.
    CPC ............ *H01Q 5/20* (2015.01); *H01Q 5/307* (2015.01); *H04B 7/0413* (2013.01); *H04W 84/12* (2013.01)

(58) Field of Classification Search
    CPC .......... H01Q 1/24; H04B 1/3827; H04B 1/40; H04B 7/04; H04B 7/0413
    See application file for complete search history.

(56) References Cited

U.S. PATENT DOCUMENTS

2020/0227820 A1*   7/2020   Zhao ...................... H01Q 21/28
2020/0411958 A1*  12/2020   Yan ....................... H04B 7/0413
2021/0120110 A1*   4/2021   Hwang ................ H04B 1/3833

FOREIGN PATENT DOCUMENTS

WO     WO-2019190015 A1 *  10/2019  ............. H01Q 1/243
WO     WO-2021000081 A1 *   1/2021  ............... H01Q 1/22

* cited by examiner

ANTENNA MODULE AND MOBILE TERMINAL

TECHNICAL FIELD

The present invention relates to the field of communication technology and, in particular to, an antenna module and a mobile terminal.

BACKGROUND

With maturity of 5G (the fifth-generation mobile communication) technology and establishment of standards, 5G commercialization is getting closer and closer to us, and more and more 5G mobile terminals will be available in the future.

How to make communication frequency bands of the mobile terminal not only meet requirements of existing frequency bands but also be compatible with a frequency band of 5G has become an urgent problem to be solved.

SUMMARY

The present invention provides an antenna module and a mobile terminal, such that the mobile terminal can be compatible with an 8*8 MIMO antenna of the 5G frequency band while satisfying existing 2G to 4G frequency bands and GPS and WIFI frequency bands.

An antenna module applied to a mobile terminal, the mobile terminal includes a shell, the shell includes an upper edge and a lower edge that are opposite to each other, a first side edge and a second side edge that are opposite to each other. A first antenna, a second antenna, a third antenna, and a fourth antenna are sequentially provided on the upper edge, and the first side edge is provided with a fifth antenna close to the upper edge. A sixth antenna, a seventh antenna, and an eighth antenna are sequentially provided on the lower edge, and the second side edge is provided with a ninth antenna close to the lower edge. The first antenna, the second antenna, the third antenna, the fourth antenna, the fifth antenna, the sixth antenna, the seventh antenna, the eighth antenna, and the ninth antenna cooperate to form at least an antenna group operating in 2G to 4G communication frequency bands, an 8*8 MIMO antenna group operating in a 5G communication frequency band, an antenna group operating in GPS and WIFI2.4G frequency bands, and an antenna group operating in a WIFI5G frequency band.

As an improvement, the 8*8 MIMO antenna group operating in the 5G communication frequency band includes the first antenna, the third antenna, the fourth antenna, the fifth antenna, the sixth antenna, and the seventh antenna, the eighth antenna and the ninth antenna, the antenna group operating in the 2G to 4G communication frequency bands includes the seventh antenna, the antenna group operating in the GPS and WIFI2.4G frequency bands includes the second antenna, and the antenna group operating in the WIFI5G frequency band includes the first antenna.

As an improvement, the 5G communication frequency band includes a first frequency band ranging from 3300 MHz to 3600 MHz and a second frequency band ranging from 4800 MHz to 4900 MHz, the first antenna, the third antenna, the fourth antenna, the fifth antenna, the sixth antenna, the seventh antenna, the eighth antenna, and the ninth antenna all operate in the first frequency band and the second frequency band.

As an improvement, the first side edge is close to the fourth antenna, and the second side edge is close to the sixth antenna.

As an improvement, the shell further includes metal frames, and the metal frames include an upper frame and a lower frame that are opposite to each other, and a first side frame and a second side frame that are opposite to each other, the first antenna, the second antenna, the third antenna, the fourth antenna, the fifth antenna, the sixth antenna, the seventh antenna, the eighth antenna and the ninth antenna are each provided with a feeding point connected to a corresponding one of the metal frames.

As an improvement, the first antenna, the second antenna, the third antenna, and the fourth antenna are provided on the upper frame, the upper frame is provided with a first break-joint and a second break-joint, the first break-joint is provided between the first antenna and the second antenna, and the second break-joint is provided between the third antenna and the fourth antenna; and the sixth antenna, the seventh antenna, and the eighth antenna are provided on the lower frame, the lower frame is provided with a third break-joint and a fourth break-joint, the third break-joint is provided between the sixth antenna and the seventh antenna, and the fourth break-joint is provided between the seventh antenna and the eighth antenna.

As an improvement, the shell further includes a metal middle frame, and a coupling is further provided between the second antenna and the third antenna and is configured to connect the upper frame with the metal middle frame.

As an improvement, the seventh antenna is further provided with a ground feeding point and a radio frequency switch, and the radio frequency switch is configured to tune a low frequency to increase a bandwidth of the low frequency.

As an improvement, each of the fifth antenna and the ninth antenna is formed by providing an L-shaped slot on the metal middle frame.

The present invention further provides a mobile terminal, and the mobile terminal is provided with a shell and an antenna module. The shell includes an upper edge and a lower edge that are opposite to each other, and a first side edge and a second side edge that are opposite to each other. The antenna module includes: a first antenna, a second antenna, a third antenna, and a fourth antenna that are sequentially provided on the upper edge; a fifth antenna provided on the first side edge and close to the upper edge; a sixth antenna, a seventh antenna, and an eighth antenna that are sequentially provided on the lower edge; and a ninth antenna provided on the second side edge and close to the lower edge. The first antenna, the second antenna, the third antenna, the fourth antenna, the fifth antenna, the sixth antenna, the seventh antenna, the eighth antenna, and the ninth antenna cooperate to form at least an antenna group operating in 2G to 4G communication frequency bands, an 8*8 MIMO antenna group operating in a 5G communication frequency band, an antenna group operating in GPS and WIFI2.4G frequency bands, and an antenna group operating in a WIFI5G frequency band.

As an improvement, the 8*8 MIMO antenna group operating in the 5G communication frequency band includes the first antenna, the third antenna, the fourth antenna, the fifth antenna, the sixth antenna, and the seventh antenna, the eighth antenna and the ninth antenna, the antenna group operating in the 2G to 4G communication frequency bands includes the seventh antenna, the antenna group operating in the GPS and WIFI2.4G frequency bands includes the second antenna, and the antenna group operating in the WIFI5G frequency band includes the first antenna.

As an improvement, the 5G communication frequency band includes a first frequency band ranging from 3300 MHz to 3600 MHz and a second frequency band ranging from 4800 MHz to 4900 MHz, the first antenna, the third antenna, the fourth antenna, the fifth antenna, the sixth antenna, the seventh antenna, the eighth antenna, and the ninth antenna all operate in the first frequency band and the second frequency band.

As an improvement, the first side edge is close to the fourth antenna, and the second side edge is close to the sixth antenna.

As an improvement, the shell further includes metal frames, and the metal frames include an upper frame and a lower frame that are opposite to each other, and a first side frame and a second side frame that are opposite to each other, the first antenna, the second antenna, the third antenna, the fourth antenna, the fifth antenna, the sixth antenna, the seventh antenna, the eighth antenna and the ninth antenna are each provided with a feeding point connected to a corresponding one of the metal frames.

As an improvement, the first antenna, the second antenna, the third antenna, and the fourth antenna are provided on the upper frame, the upper frame is provided with a first break-joint and a second break-joint, the first break-joint is provided between the first antenna and the second antenna, and the second break-joint is provided between the third antenna and the fourth antenna; and the sixth antenna, the seventh antenna, and the eighth antenna are provided on the lower frame, the lower frame is provided with a third break-joint and a fourth break-joint, the third break-joint is provided between the sixth antenna and the seventh antenna, and the fourth break-joint is provided between the seventh antenna and the eighth antenna.

As an improvement, the shell further includes a metal middle frame, and a coupling is further provided between the second antenna and the third antenna and is configured to connect the upper frame with the metal middle frame.

As an improvement, the seventh antenna is further provided with a ground feeding point and a radio frequency switch, and the radio frequency switch is configured to tune a low frequency to increase a bandwidth of the low frequency.

As an improvement, each of the fifth antenna and the ninth antenna is formed by providing an L-shaped slot on the metal middle frame.

In the antenna module and the mobile terminal, the first antenna, the second antenna, the third antenna, and the fourth antenna are provided on the upper edge of the shell of the mobile terminal, the fifth antenna is provided on the first side edge, the sixth antenna, the seventh antenna and the eighth antenna are provided on the lower edge, the ninth antenna is provided on the second side edge, such that the first antenna, the second antenna, the third antenna, the fourth antenna, the fifth antenna, the sixth antenna, the seventh antenna, the eighth antenna, and the ninth antenna cooperate to form the antenna group operating in the 2G to 4G communication frequency bands, the 8*8 MIMO antenna group operating in the 5G communication frequency band, the antenna group operating in the GPS and WIFI2.4G frequency bands, and the antenna group operating in the WIFI5G frequency band. The antenna module can not only operate in the traditional 2G to 4G frequency bands, GPS and WIFI2.4G and WIFI5G frequency bands, but also be laid with the 8*8 MIMO antenna operating in the 5G communication band and the antenna operating in the WIFI5G frequency band, such that the mobile terminal can be compatible with multiple frequency bands and take an antenna performance and isolation between the antennas into account, thereby improving a communication performance of the mobile terminal.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

In order to make the objectives, technical solutions and advantages of the present invention clearer, the present invention will be further described in detail below with reference to the accompanying drawings and embodiments. It should be understood that the specific embodiments described herein are only used to explain the present invention and are not intended to limit the present invention.

Figure 1:
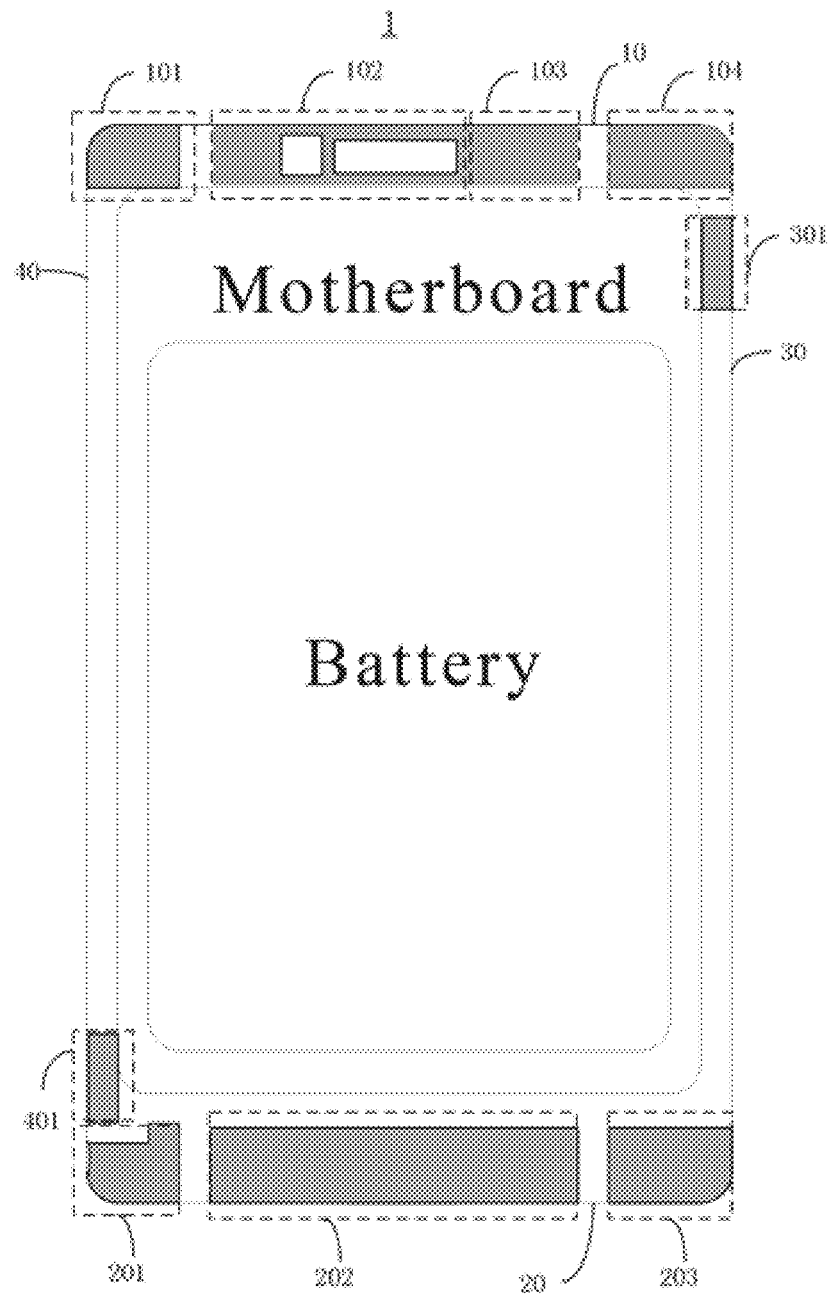
FIG. 1 is a schematic diagram of a layout structure of an antenna module provided in a mobile terminal in an embodiment.

As shown in FIG. 1, the present invention provides a mobile terminal 1, and the mobile terminal 1 can be a smart phone, a tablet computer, a wearable device, or the like. For ease of understanding, the smartphone is taken as an example for description.

The mobile terminal 1 includes a shell, a motherboard, a battery, and an antenna module. The antenna module includes a first antenna, a second antenna, a third antenna, a fourth antenna, a fifth antenna, a sixth antenna, a seventh antenna, an eighth antenna, and a ninth antenna.

The shell includes an upper edge 10 and a lower edge 20 that are opposite to each other, and a first side edge 30 and a second side edge 40 that are opposite to each other. A first antenna 101, a second antenna 102, a third antenna 103, and a fourth antenna 104 are sequentially provided on the upper edge 10, and the first side edge 30 is provided with a fifth antenna 301 close to the upper edge 10. A sixth antenna 201, a seventh antenna 202, and an eighth antenna 203 are sequentially provided on the lower edge 20, and the second side edge 40 is provided with a ninth antenna 401 close to the lower edge.

The first antenna 101, the second antenna 102, the third antenna 103, the fourth antenna 104, the fifth antenna 301, the sixth antenna 201, the seventh antenna 202, the eighth antenna 203, and the ninth antenna 401 cooperate to form at least an antenna group operating in 2G to 4G communication frequency bands, an 8*8 MIMO antenna group operating in a 5G communication frequency band, an antenna group operating in GPS and WIFI2.4G frequency bands, and an antenna group operating in a WIFI5G frequency band.

The upper edge, the lower edge, the first side edge and the second side edge are edge areas at the periphery of the shell, i.e., upper, lower, left and right sides of the shell. The shell is a rear shell of the mobile terminal.

The 2G to 4G communication frequency bands include a band ranging from 699 MHz to 960 MHz and a band ranging from 1710 MHz to 2690 MHz. The 5G communication frequency band includes a band ranging from 3300 MHz to 3600 MHz and a band ranging from 4800 MHz to 4900 MHz. The WIFI5G frequency band includes a band ranging from 5150 MHz to 5850 MHz. The GPS/WIFI frequency band includes a frequency of 1575 MHz and a band ranging from 2400 MHz to 2500 MHz.

In an embodiment, the above nine antennas can be customarily combined according to needs. For example, eight antennas are selected from the above nine antennas as the antennas operating in the 5G communication frequency band to form an 8*8 MIMO antenna group, one antenna is selected from the above nine antennas as the antenna operating in the 2G to 4G communication frequency bands, one antenna is selected from the above nine antennas as the antenna operating in the GPS and WIFI2.4G frequency bands, and one of the above nine antennas is selected as the antenna operating in the WIFI5G frequency band.

In an embodiment, the 8*8 MIMO antenna group operating in the 5G communication frequency band includes the first antenna 101, the third antenna 103, the fourth antenna 104, the fifth antenna 301, the sixth antenna 201, and the seventh antenna 202, the eighth antenna 203 and the ninth antenna 401, that is, these eight antennas form the 8*8 MIMO antenna group.

In an embodiment, the antenna group operating in the 2G to 4G communication frequency bands includes the seventh antenna, and the antenna group of the GPS and WIFI2.4G frequency bands includes the second antenna.

The seventh antenna is the antenna operating in the 2G to 4G frequency bands, also the antenna operating in the 5G frequency band, and also the antenna operating in the WIFI5G frequency band. In an embodiment, the second antenna is a three-in-one (3in1) antenna of the GPS and WIFI, and the three-in-one antenna includes a GPS antenna, a WIFI2.4G antenna and a WIFI5.0G antenna. In another embodiment, the second antenna can also be a three-in-one antenna of the GPS, WIFI, and Bluetooth.

In an embodiment, the 5G communication frequency band includes two frequency bands, which are respectively a first frequency band ranging from 3300 MHz to 3600 MHz and a second frequency band ranging from 4800 MHz to 4900 MHz, the first antenna 101, the third antenna 103, the fourth antenna 104, the fifth antenna 301, the sixth antenna 201, the seventh antenna 202, the eighth antenna 203, and the ninth antenna 401 all operate in the first frequency band ranging from 3300 MHz to 3600 MHz and the second frequency band ranging from 4800 MHz to 4900 MHz. In addition, the first antenna also works in the WIFI5G frequency band, that is, a frequency band ranging from 5150 MHz to 5850 MHz.

Referring to FIG. 1, the first side edge 30 is located at a position close to the fourth antenna 104, and the second side edge 40 is close to the sixth antenna 201.

In another embodiment, the first side edge is located at a position close to the first antenna, and the second side edge is close to the ninth antenna.

Figure 2:
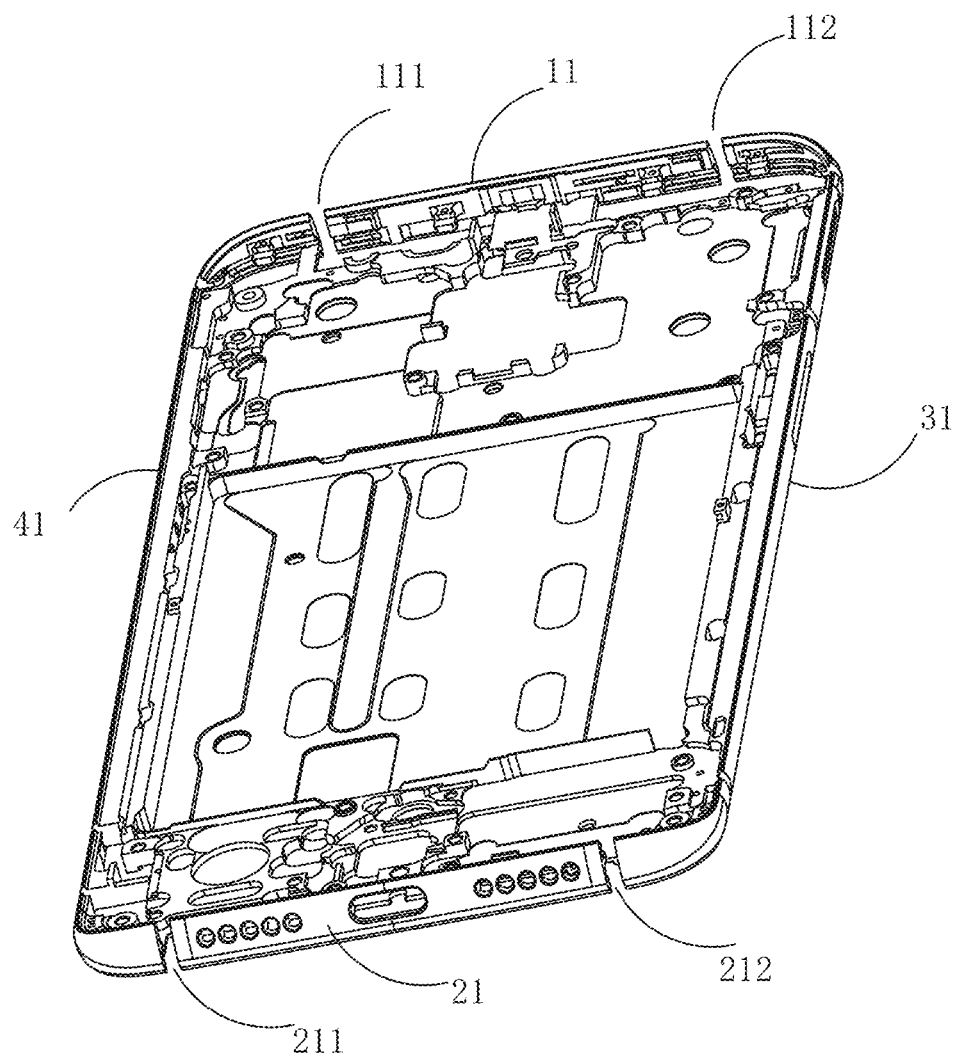
FIG. 2 is a schematic diagram of a rear shell of a mobile terminal in an embodiment.

As shown in FIG. 2, which is a schematic diagram of a rear shell (shell) of a mobile terminal in an embodiment, the shell further includes metal frames. The metal frames include an upper frame 11 and a lower frame 21 that are opposite to each other, and a first side frame 31 and a second side frame 41 that are opposite to each other.

Referring to FIG. 2, in an embodiment, the first antenna, the second antenna, the third antenna, and the fourth antenna are provided on the upper frame, the upper frame 11 is provided with a first break-joint 111 and a second break-joint 112, the first break-joint 111 is provided between the first antenna and the second antenna, and the second break-joint 112 is provided between the third antenna and the fourth antenna.

The sixth antenna, the seventh antenna, and the eighth antenna are provided on the lower frame 21, the lower frame is provided with a third break-joint 211 and a fourth break-joint 212, the third break-joint is provided between the sixth antenna and the seventh antenna, and the fourth break-joint is provided between the seventh antenna and the eighth antenna.

In another embodiment, setting of the break-joint can be customized according to needs. For example, each antenna can be provided with a break-joint correspondingly.

Figure 3A:
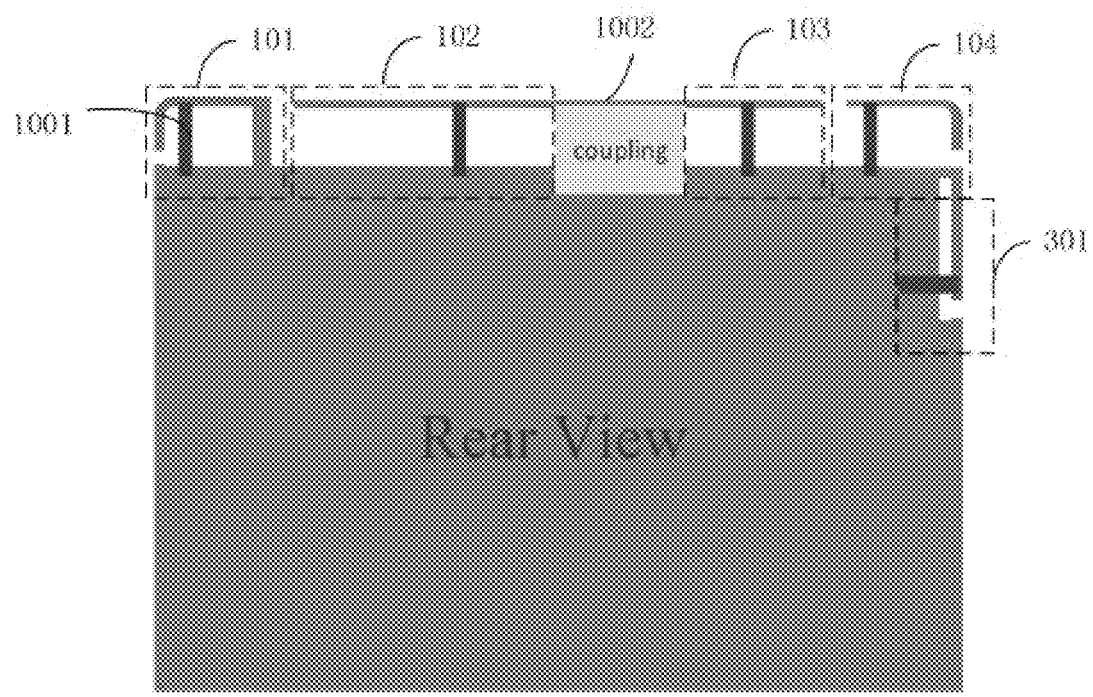
FIG. 3A and FIG. 3B are respectively an upper half portion and a lower half portion of a schematic diagram of a rear layout structure of an antenna module provided in a mobile terminal in an embodiment.
Figure 3B:
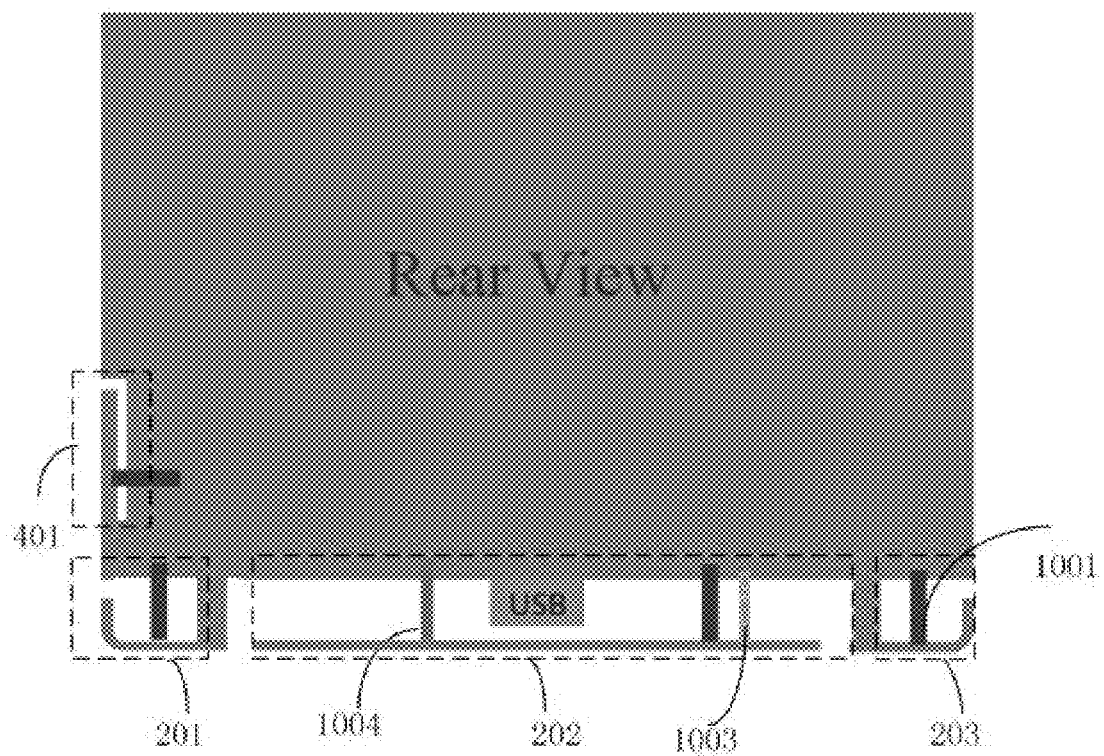

As shown in FIG. 3A and FIG. 3B, the first antenna, the second antenna, the third antenna, the fourth antenna, the fifth antenna, the sixth antenna, the seventh antenna, the eighth antenna and the ninth antenna are each provided with a feeding point 1001, and the feeding point in each antenna is connected to a corresponding one of metal frames.

In an embodiment, the shell further includes a metal middle frame (not shown in the drawing), and a coupling 1002 is further provided between the second antenna and the third antenna and connects the upper frame 11 with the metal middle frame.

Referring to FIG. 3B, in an embodiment, the seventh antenna is further provided with a ground feeding point 1003 and a radio frequency switch 1004, and the radio frequency switch is configured to tune a low frequency to increase a bandwidth of the low frequency.

In an embodiment, both the fifth antenna and the ninth antenna are formed by providing an L-shaped slot on the metal middle frame.

As shown in FIG. 4 to FIG. 12, schematic diagrams of reflection coefficients of the first antenna, the second antenna, the third antenna, the fourth antenna, the fifth antenna, the sixth antenna, the seventh antenna, the eighth antenna and the ninth antenna in an embodiment are illustrated.

Figure 4:
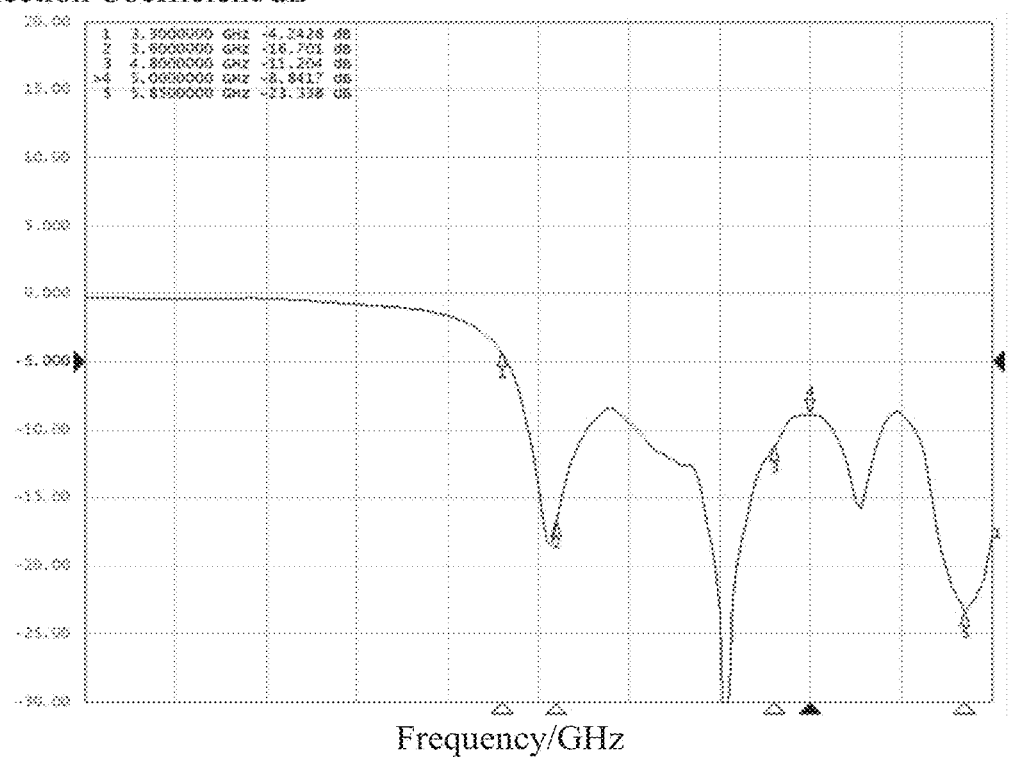
FIG. 4 is a schematic diagram of a reflection coefficient of a first antenna when operating in a frequency band ranging from 3300 MHz to 3600 MHz, a frequency band ranging from 4800 MHz to 4900 MHz and a frequency band of WIFI5G (5150 MHz to 5850 MHz)
Figure 5:
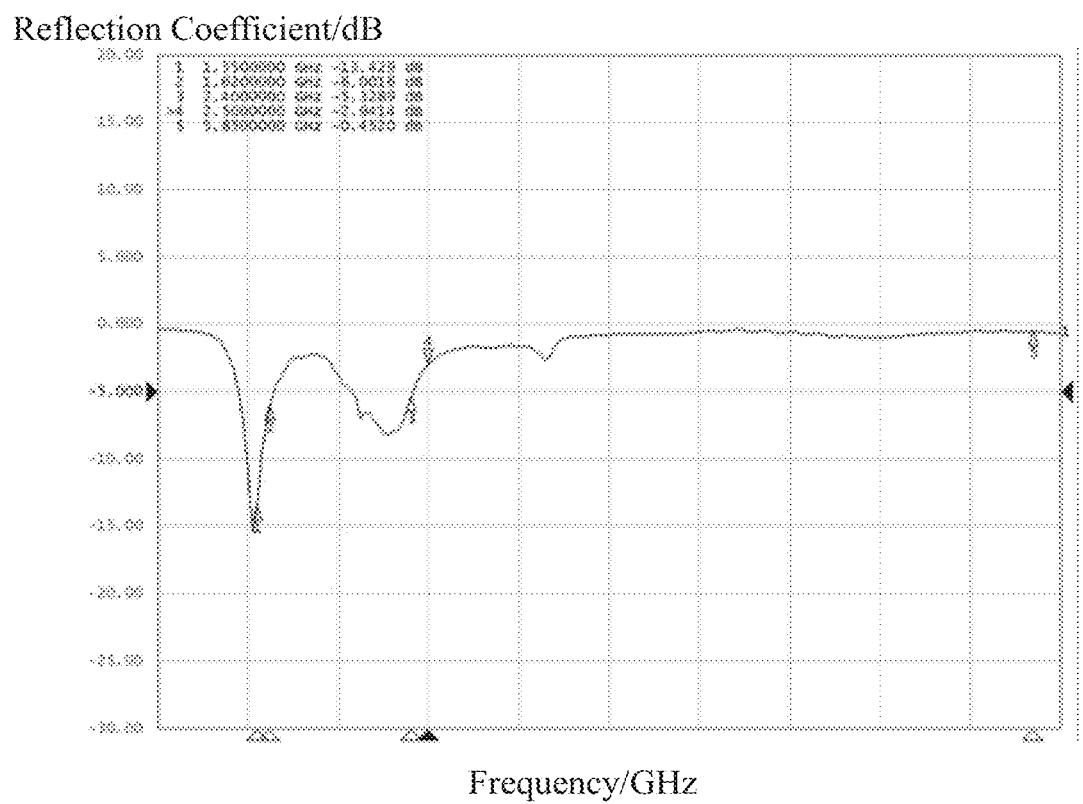
FIG. 5 is a schematic diagram of a reflection coefficient of a second antenna when operating at 1575 MHz and operating in a frequency band ranging from 2400 MHz to 2500 MHz.
Figure 6:
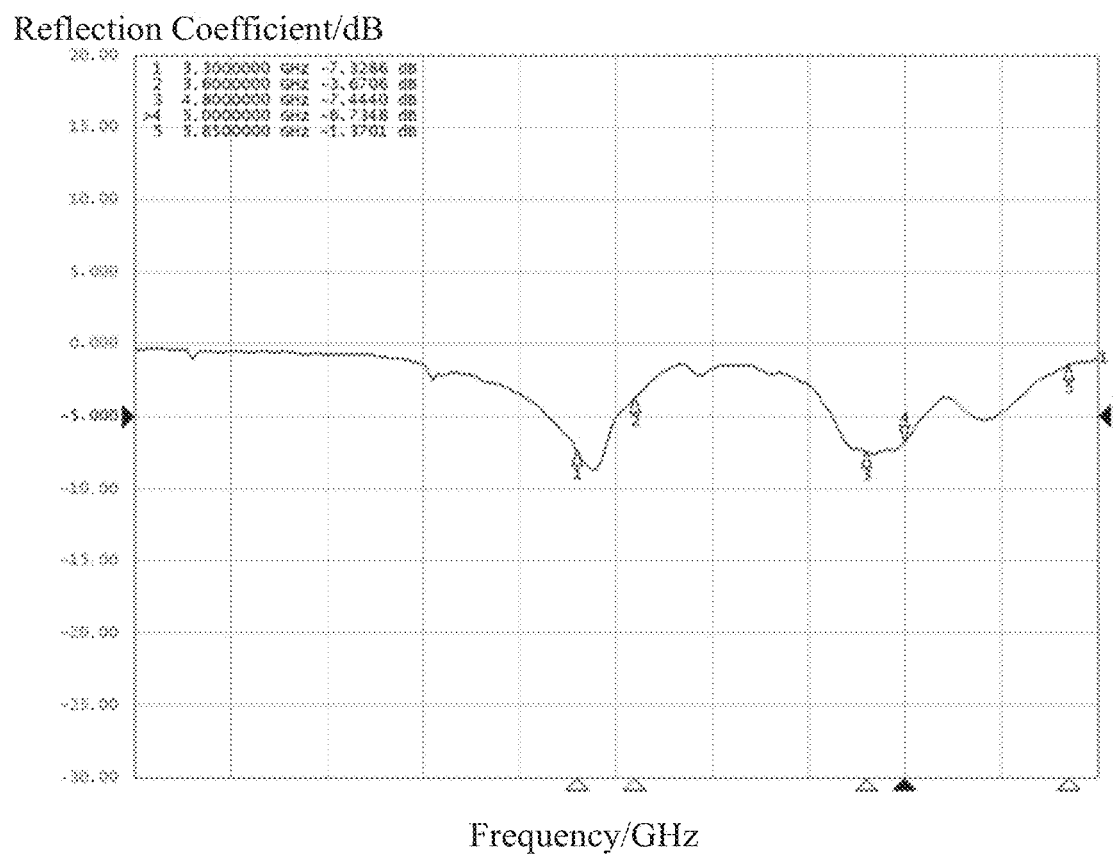
FIG. 6 is a schematic diagram of a reflection coefficient of a third antenna when operating in a frequency bands ranging from 3300 MHz to 3600 MHz and a frequency band ranging from 4800 MHz to 4900 MHz.
Figure 7:
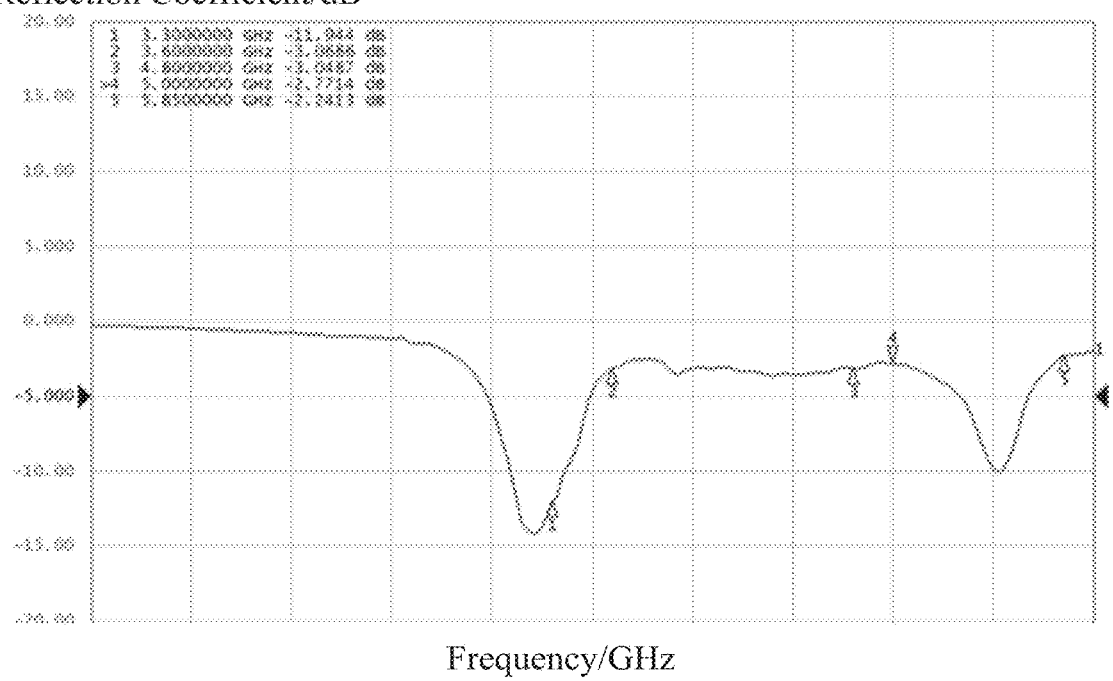
FIG. 7 is a schematic diagram of a reflection coefficient of a fourth antenna when operating in a frequency band ranging from 3300 MHz to 3600 MHz and a frequency band ranging from 4800 MHz to 4900 MHz.
Figure 8:
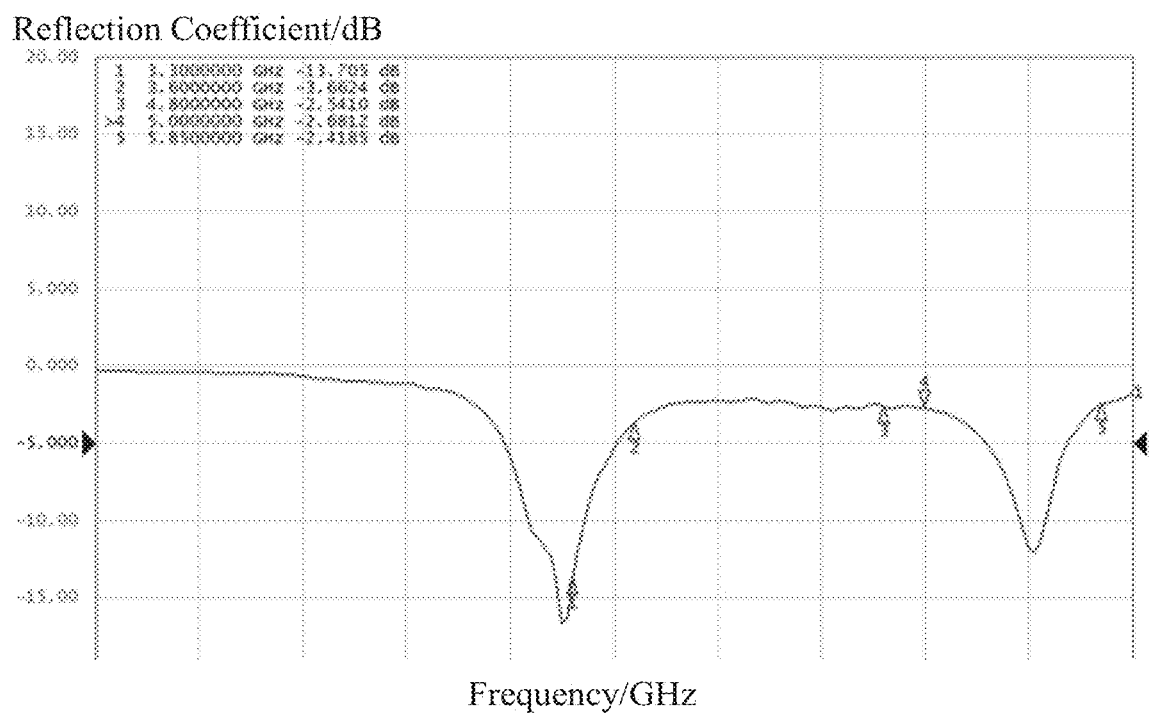
FIG. 8 is a schematic diagram of a reflection coefficient of a fifth antenna when operating in a frequency band ranging from 3300 MHz to 3600 MHz and a frequency band ranging from 4800 MHz to 4900 MHz.
Figure 9:
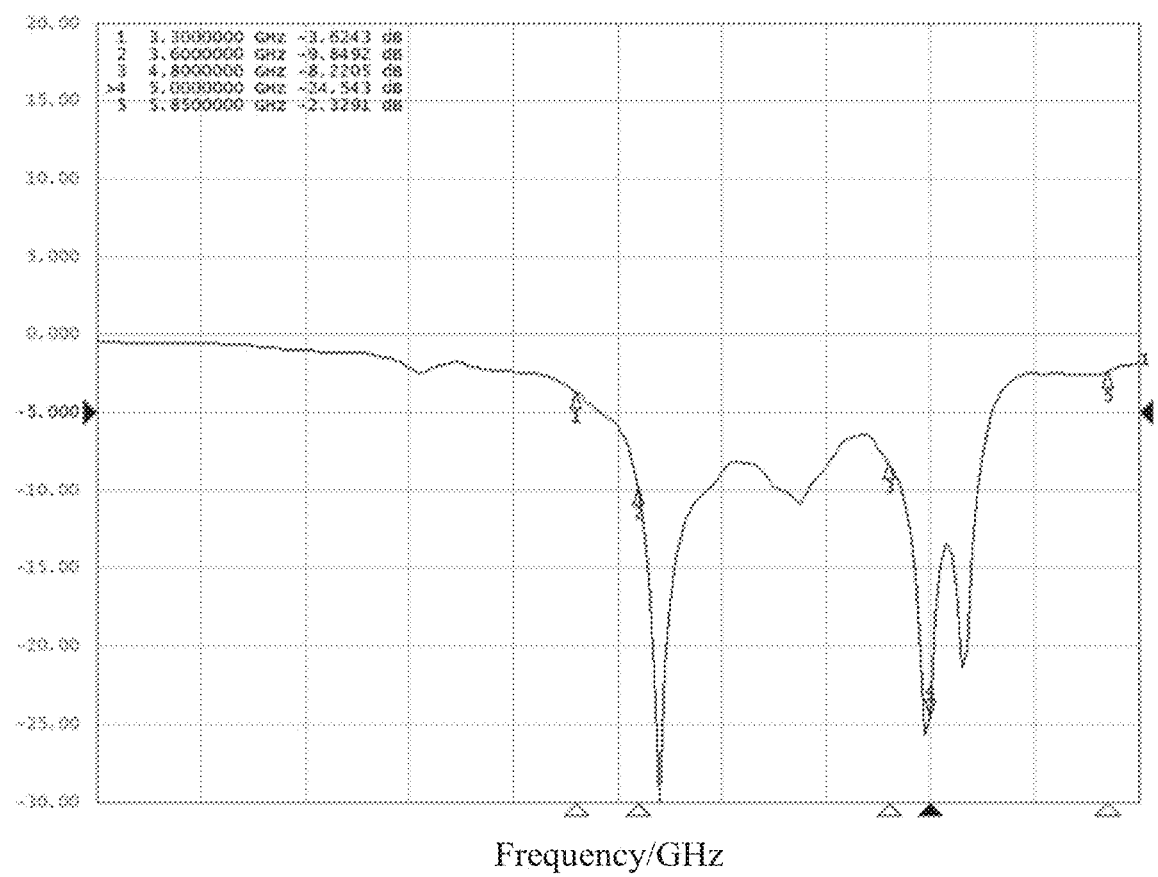
FIG. 9 is a schematic diagram of a reflection coefficient of a sixth antenna when operating in a frequency band ranging from 3300 MHz to 3600 MHz and a frequency band ranging from 4800 MHz to 4900 MHz.
Figure 10:
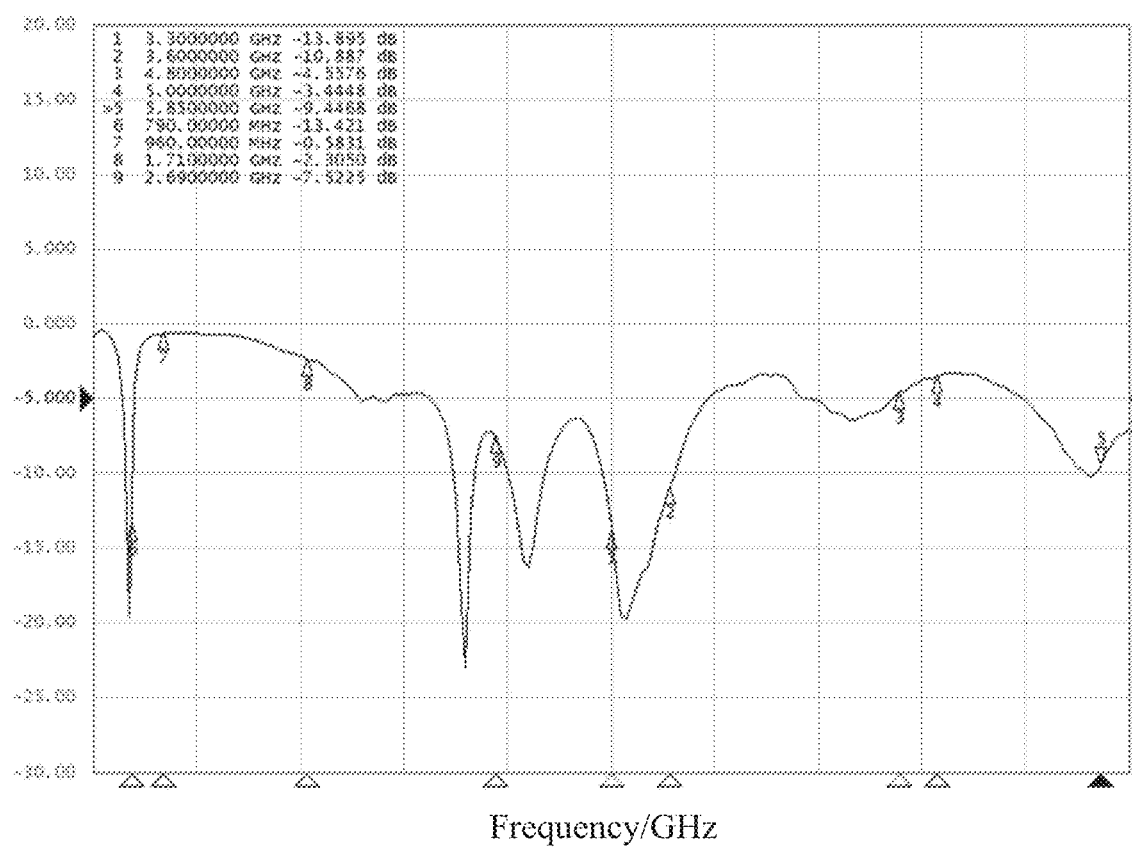
FIG. 10 is a schematic diagram of a reflection coefficient of a seventh antenna when operating in a frequency band ranging from 699 MHz to 960 MHz, a frequency band ranging from 1710 MHz to 2690 MHz, a frequency band ranging from 3300 MHz to 3600 MHz and a frequency band ranging from 4800 MHz to 4900 MHz.
Figure 11:
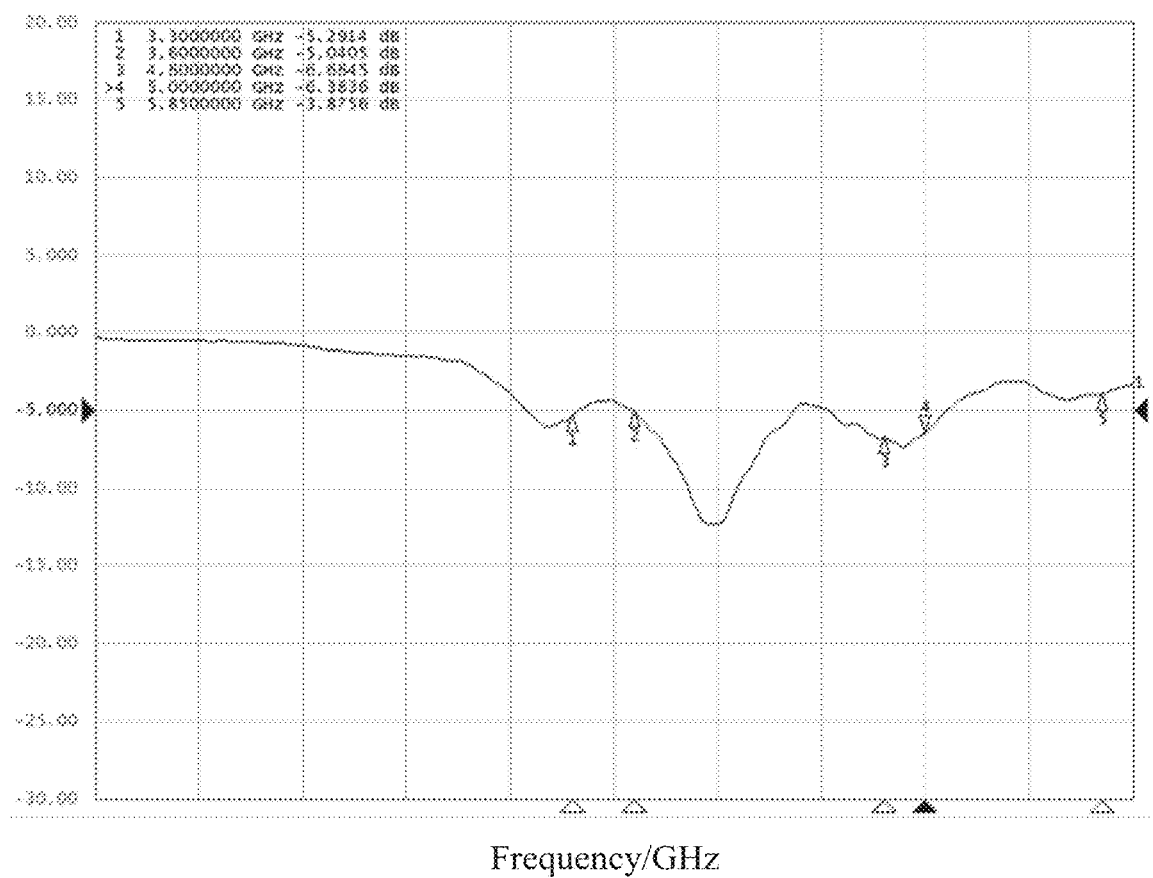
FIG. 11 is a schematic diagram of a reflection coefficient of an eighth antenna when operating in a frequency band ranging from 3300 MHz to 3600 MHz and a frequency band ranging from 4800 MHz to 4900 MHz.
Figure 12:
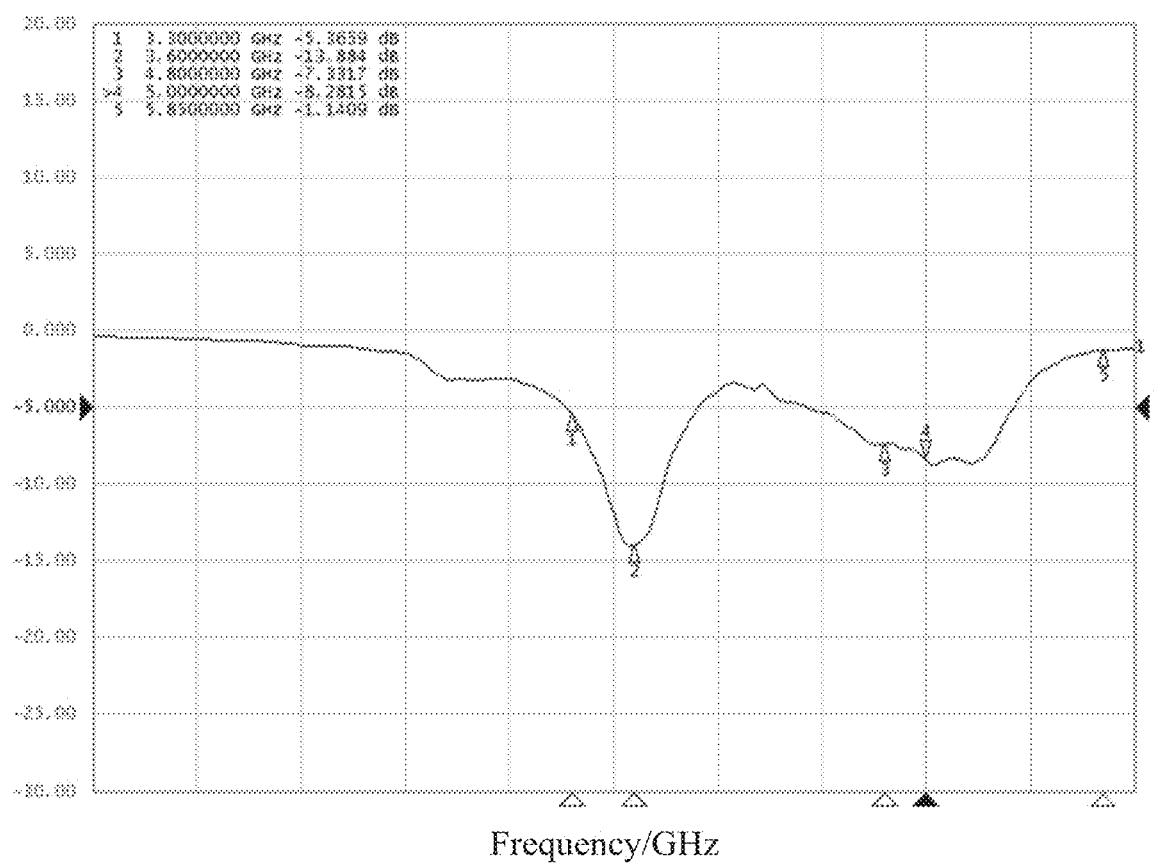
FIG. 12 is a schematic diagram of a reflection coefficient of a ninth antenna when operating in a frequency band ranging from 3300 MHz to 3600 MHz and a frequency band ranging from 4800 MHz to 4900 MHz.

FIG. 4 is a schematic diagram of a reflection coefficient of a first antenna when operating in a frequency band ranging from 3300 MHz to 3600 MHz, a frequency band ranging from 4800 MHz to 4900 MHz and a frequency band of WIFI5G (5150 MHz to 5850 MHz). FIG. 5 is a schematic diagram of a reflection coefficient of a second antenna when operating at 1575 MHz and operating in a frequency band ranging from 2400 MHz to 2500 MHz. FIG. 6 is a schematic diagram of a reflection coefficient of a third antenna when operating in a frequency bands ranging from 3300 MHz to 3600 MHz and a frequency band ranging from 4800 MHz to 4900 MHz. FIG. 7 is a schematic diagram of a reflection coefficient of a fourth antenna when operating in a frequency band ranging from 3300 MHz to 3600 MHz and a frequency band ranging from 4800 MHz to 4900 MHz. FIG. 8 is a schematic diagram of a reflection coefficient of a fifth antenna when operating in a frequency band ranging from 3300 MHz to 3600 MHz and a frequency band ranging from 4800 MHz to 4900 MHz. FIG. 9 is a schematic diagram of a reflection coefficient of a sixth antenna when operating in a frequency band ranging from 3300 MHz to 3600 MHz and a frequency band ranging from 4800 MHz to 4900 MHz. FIG. 10 is a schematic diagram of a reflection coefficient of a seventh antenna when operating in a frequency band ranging from 699 MHz to 960 MHz, a frequency band ranging from 1710 MHz to 2690 MHz, a frequency band ranging from 3300 MHz to 3600 MHz and a frequency band ranging from 4800 MHz to 4900 MHz. FIG. 11 is a schematic diagram of a reflection coefficient of an eighth antenna when operating in a frequency band ranging from 3300 MHz to 3600 MHz and a frequency band ranging from 4800 MHz to 4900 MHz. FIG. 12 is a schematic diagram of a reflection coefficient of a ninth antenna when operating in a frequency band ranging from 3300 MHz to 3600 MHz and a frequency band ranging from 4800 MHz to 4900 MHz.

Figure 13:
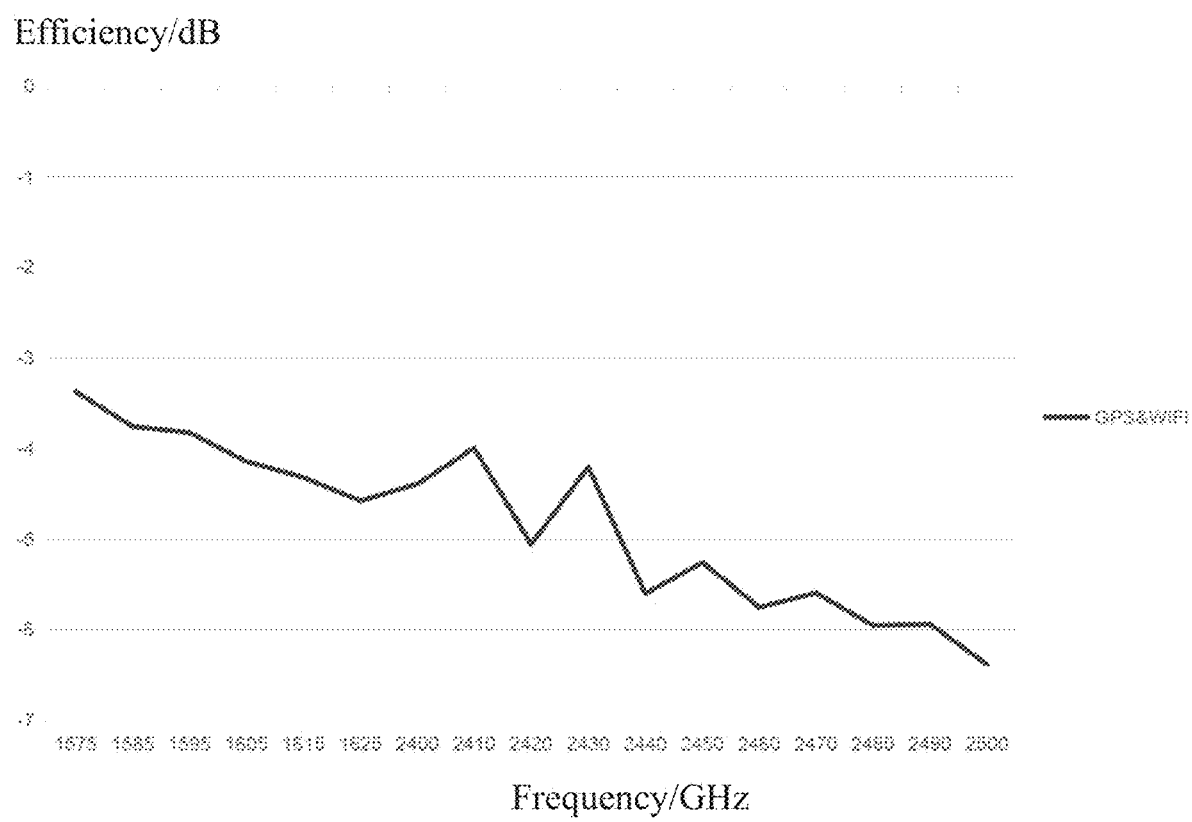
FIG. 13 is a schematic diagram of an efficiency of a second antenna when operating in frequency bands of GPS (1550 MHz to 1620 MHz) and WIFI2.4G (2400 MHz to 2500 MHz)
Figure 14:
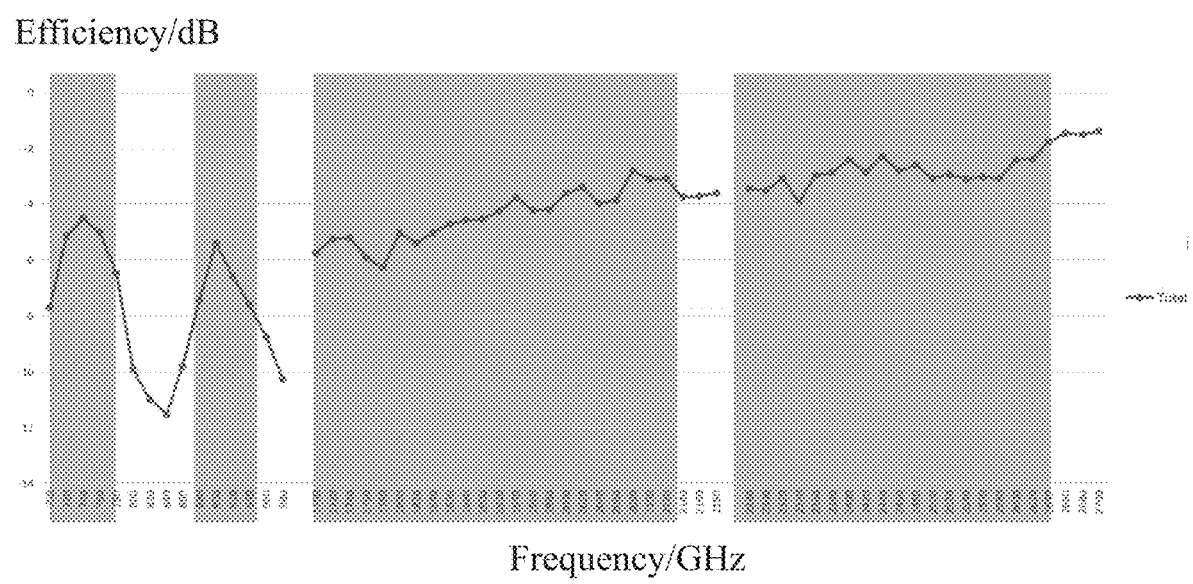
FIG. 14 is a schematic diagram of an efficiency of a seventh antenna when operating in a frequency bands ranging from 699 MHz to 960 MHz, a frequency band ranging from 1710 MHz to 2690 MHz, a frequency band ranging from 3300 MHz to 3600 MHz and a frequency band ranging from 4800 MHz to 4900 MHz.

As shown in FIG. 13 and FIG. 14, a schematic diagram of an efficiency of the GPS and WIFI antenna (that is, the second antenna) and schematic diagram of an efficiency of the seventh antenna (a main antenna operating in frequency band including the 2G to 5G frequency bands) in an embodiment are illustrated.

The various technical features of the above embodiments can be arbitrarily combined. To simplify the description, not all possible combinations of the various technical features in the above embodiments are described, but they should be regarded as within the scope of this description as long as there is no contradiction in the combination of these technical features.

The above embodiment only expresses several implementation manners of the present invention, and its description is relatively specific and detailed, but it should not be understood as a limitation of the patent scope of the present invention. It should be noted that, for those of ordinary skill in the art, a number of modifications and improvements can also be made without departing from the concept of the present invention, and all these fall within the protection scope of the present invention. Therefore, the protection scope of the present invention shall be subject to the appended claims.

What is claimed is:

1. An antenna module, applied to a mobile terminal comprising a shell, the shell comprising an upper edge and a lower edge that are opposite to each other, and a first side edge and a second side edge that are opposite to each other, wherein the antenna module comprises:
   a first antenna, a second antenna, a third antenna, and a fourth antenna that are sequentially provided on the upper edge;
   a fifth antenna provided on the first side edge and close to the upper edge;
   a sixth antenna, a seventh antenna, and an eighth antenna that are sequentially provided on the lower edge; and
   a ninth antenna provided on the second side edge and close to the lower edge,
   wherein the first antenna, the second antenna, the third antenna, the fourth antenna, the fifth antenna, the sixth antenna, the seventh antenna, the eighth antenna, and the ninth antenna cooperate to form at least an antenna group operating in 2G to 4G communication frequency bands, an 8*8 MIMO antenna group operating in a 5G communication frequency band, an antenna group operating in GPS and WIFI2.4G frequency bands, and an antenna group operating in a WIFI5G frequency band,
   wherein the 8*8 MIMO antenna group operating in the 5G communication frequency band comprises the first antenna, the third antenna, the fourth antenna, the fifth antenna, the sixth antenna, and the seventh antenna, the eighth antenna and the ninth antenna;
   the antenna group operating in the 2G to 4G communication frequency bands comprises the seventh antenna;
   the antenna group operating in the GPS and WIFI2.4G frequency bands comprises the second antenna; and
   the antenna group operating in the WIFI5G frequency band comprises the first antenna.

2. The antenna module as described in claim 1, wherein the 5G communication frequency band comprises a first frequency band ranging from 3300 MHz to 3600 MHz and a second frequency band ranging from 4800 MHz to 4900 MHz, and
   the first antenna, the third antenna, the fourth antenna, the fifth antenna, the sixth antenna, the seventh antenna, the eighth antenna, and the ninth antenna all operate in the first frequency band and the second frequency band.

3. The antenna module as described in claim 1, wherein the first side edge is close to the fourth antenna, and the second side edge is close to the sixth antenna.

4. The antenna module as described in claim 1, wherein the shell further comprises metal frames, and the metal frames comprise an upper frame and a lower frame that are opposite to each other, and a first side frame and a second side frame that are opposite to each other, and the first antenna, the second antenna, the third antenna, the fourth antenna, the fifth antenna, the sixth antenna, the seventh antenna, the eighth antenna and the ninth antenna are each provided with a feeding point connected to a corresponding one of the metal frames.

5. The antenna module as described in claim 4, wherein the first antenna, the second antenna, the third antenna, and the fourth antenna are provided on the upper frame, the upper frame is provided with a first break-joint and a second break-joint, the first break-joint is provided between the first antenna and the second antenna, and the second break-joint is provided between the third antenna and the fourth antenna, and the sixth antenna, the seventh antenna, and the eighth antenna are provided on the lower frame, the lower frame is provided with a third break-joint and a fourth break-joint, the third break-joint is provided between the sixth antenna and the seventh antenna, and the fourth break-joint is provided between the seventh antenna and the eighth antenna.

6. The antenna module as described in claim 4, wherein the shell further comprises a metal middle frame, and a coupling is further provided between the second antenna and the third antenna and is configured to connect the upper frame with the metal middle frame.

7. The antenna module as described in claim 6, wherein each of the fifth antenna and the ninth antenna is formed by providing an L-shaped slot on the metal middle frame.

8. The antenna module as described in claim 1, wherein the seventh antenna is further provided with a ground feeding point and a radio frequency switch, and the radio frequency switch is configured to tune a low frequency to increase a bandwidth of the low frequency.

9. A mobile terminal, comprising:
a shell, wherein the shell comprises an upper edge and a lower edge that are opposite to each other, and a first side edge and a second side edge that are opposite to each other; and
an antenna module, wherein the antenna module comprises:
a first antenna, a second antenna, a third antenna, and a fourth antenna that are sequentially provided on the upper edge;
a fifth antenna provided on the first side edge and close to the upper edge;
a sixth antenna, a seventh antenna, and an eighth antenna that are sequentially provided on the lower edge; and
a ninth antenna provided on the second side edge and close to the lower edge,
wherein the first antenna, the second antenna, the third antenna, the fourth antenna, the fifth antenna, the sixth antenna, the seventh antenna, the eighth antenna, and the ninth antenna cooperate to form at least an antenna group operating in 2G to 4G communication frequency bands, an 8*8 MIMO antenna group operating in a 5G communication frequency band, an antenna group operating in GPS and WIFI2.4G frequency bands, and an antenna group operating in a WIFI5G frequency band wherein the 8*8 MIMO antenna group operating in the 5G communication frequency band comprises the first antenna, the third antenna, the fourth antenna, the fifth antenna, the sixth antenna and the seventh antenna, the eighth antenna and the ninth antenna;
the antenna group operating in the 2G to 4G communication frequency bands comprises the seventh antenna;
the antenna group operating in the GPS and the WIFI2.4G frequency bands comprises the second antenna, and
the antenna group operating in the WIFI5G frequency band comprises the first antenna.

10. The mobile terminal as described in claim 9, wherein the communication frequency band of 5G comprises a first frequency band ranging from 3300 MHz to 3600 MHz and a second frequency band ranging from 4800 MHz to 4900 MHz, and the first antenna, the third antenna, the fourth antenna, the fifth antenna, the sixth antenna, the seventh antenna, the eighth antenna, and the ninth antenna all operate in the first frequency band and the second frequency band.

11. The mobile terminal as described in claim 9, wherein the first side edge is close to the fourth antenna, and the second side edge is close to the sixth antenna.

12. The mobile terminal as described in claim 9, wherein the shell further comprises metal frames, and the metal frames comprise an upper frame and a lower frame that are opposite to each other, and a first side frame and a second side frame that are opposite to each other;

the first antenna, the second antenna, the third antenna, the fourth antenna, the fifth antenna, the sixth antenna, the seventh antenna, the eighth antenna and the ninth antenna are each provided with a feeding point connected to a corresponding one of the metal frames.

13. The mobile terminal as described in claim 12, wherein the first antenna, the second antenna, the third antenna, and the fourth antenna are provided on the upper frame, the upper frame is provided with a first break-joint and a second break-joint, the first break-joint is provided between the first antenna and the second antenna, and the second break-joint is provided between the third antenna and the fourth antenna;

the sixth antenna, the seventh antenna, and the eighth antenna are provided on the lower frame, the lower frame is provided with a third break-joint and a fourth break-joint, the third break-joint is provided between the sixth antenna and the seventh antenna, and the fourth break-joint is provided between the seventh antenna and the eighth antenna.

14. The mobile terminal as described in claim 12, wherein the shell further comprises a metal middle frame;

a coupling is further provided between the second antenna and the third antenna and is configured to connect the upper frame with the metal middle frame.

15. The mobile terminal as described in claim 14, wherein each of the fifth antenna and the ninth antenna is formed by providing an L-shaped slot on the metal middle frame.

16. The mobile terminal as described in claim 9, wherein the seventh antenna is further provided with a ground feeding point and a radio frequency switch, and the radio frequency switch is configured to tune a low frequency to increase a bandwidth of the low frequency.

* * * * *